United States Patent
Lang et al.

(10) Patent No.: US 8,990,360 B2
(45) Date of Patent: Mar. 24, 2015

(54) SYSTEM, METHOD, AND COMPUTER PROGRAM FOR REMOTELY MANAGING A DIGITAL DEVICE

(75) Inventors: Jonathan Lang, Santa Barbara, CA (US); Chris Fowler, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 610 days.

(21) Appl. No.: 12/070,933

(22) Filed: Feb. 22, 2008

(65) Prior Publication Data

US 2009/0216855 A1     Aug. 27, 2009

(51) Int. Cl.
*G06F 15/16* (2006.01)
*G06F 11/30* (2006.01)
*G06F 9/445* (2006.01)
*G06F 11/22* (2006.01)

(52) U.S. Cl.
CPC ... *G06F 11/30* (2013.01); *G06F 8/65* (2013.01); *G06F 11/2294* (2013.01)
USPC ............................ 709/220; 709/223

(58) Field of Classification Search
USPC ................ 709/223, 224, 228, 229, 246
See application file for complete search history.

(56) References Cited

U.S. PATENT DOCUMENTS

| | | | |
|---|---|---|---|
| 5,732,275 A * | 3/1998 | Kullick et al. | 717/170 |
| 5,764,992 A * | 6/1998 | Kullick et al. | 717/170 |
| 5,918,213 A * | 6/1999 | Bernard et al. | 705/26.35 |
| 6,011,489 A * | 1/2000 | Ki Kwan et al. | 340/12.3 |
| 6,727,826 B1 * | 4/2004 | Ki Kwan et al. | 340/12.3 |
| 7,174,312 B2 * | 2/2007 | Harper et al. | 705/35 |
| 7,467,404 B2 * | 12/2008 | McAllister et al. | 726/9 |
| 7,778,635 B2 * | 8/2010 | Crookham et al. | 455/426.1 |
| 7,987,238 B2 * | 7/2011 | Hook et al. | 709/217 |
| 2002/0116082 A1 * | 8/2002 | Gudorf | 700/94 |
| 2002/0180803 A1 * | 12/2002 | Kaplan et al. | 345/810 |
| 2003/0025689 A1 * | 2/2003 | Kim | 345/211 |
| 2003/0083925 A1 * | 5/2003 | Weaver et al. | 705/10 |
| 2003/0084337 A1 * | 5/2003 | Simionescu et al. | 713/200 |
| 2003/0088538 A1 * | 5/2003 | Ballard | 707/1 |
| 2003/0135381 A1 * | 7/2003 | Mathiesen et al. | 705/1 |
| 2004/0048233 A1 * | 3/2004 | Matthews et al. | 434/350 |
| 2004/0049547 A1 * | 3/2004 | Matthews et al. | 709/206 |
| 2004/0117631 A1 * | 6/2004 | Colvin | 713/179 |
| 2004/0117644 A1 * | 6/2004 | Colvin | 713/193 |
| 2004/0117663 A1 * | 6/2004 | Colvin | 713/202 |
| 2004/0117664 A1 * | 6/2004 | Colvin | 713/202 |
| 2004/0225894 A1 * | 11/2004 | Colvin | 713/200 |
| 2004/0255000 A1 * | 12/2004 | Simionescu et al. | 709/208 |
| 2005/0015760 A1 * | 1/2005 | Ivanov et al. | 717/168 |
| 2006/0041887 A1 * | 2/2006 | Dusio | 718/100 |
| 2006/0059434 A1 * | 3/2006 | Boss et al. | 715/780 |
| 2006/0268664 A1 * | 11/2006 | Lewis et al. | 367/139 |
| 2007/0028120 A1 * | 2/2007 | Wysocki et al. | 713/192 |
| 2007/0093243 A1 * | 4/2007 | Kapadekar et al. | 455/419 |
| 2007/0264984 A1 * | 11/2007 | Stavenow et al. | 455/414.1 |

(Continued)

OTHER PUBLICATIONS

SOnos Digital Music system Guide version 090101, Sep. 2006.*

*Primary Examiner* — Sargon Nano
(74) *Attorney, Agent, or Firm* — Hanley, Flight and Zimmerman, LLC

(57) ABSTRACT

A system, method, and computer program for remotely managing a digital device is provided. One or more digital devices are monitored. At least one matter associated with the one or more digital devices is identified. A resolution to address the at least one matter is generated. The resolution is then distributed from a remote location.

24 Claims, 5 Drawing Sheets

(56) References Cited

U.S. PATENT DOCUMENTS

| | | | |
|---|---|---|---|
| 2007/0293232 A1* | 12/2007 | Nonaka | 455/450 |
| 2008/0168135 A1* | 7/2008 | Redlich et al. | 709/204 |
| 2008/0225124 A1* | 9/2008 | Schinner et al. | 348/207.99 |
| 2008/0244033 A1* | 10/2008 | Hook et al. | 709/217 |
| 2008/0288615 A1* | 11/2008 | Bajwa et al. | 709/220 |
| 2009/0094540 A1* | 4/2009 | Gray et al. | 715/764 |
| 2009/0098736 A1* | 4/2009 | Iijima et al. | 438/720 |
| 2010/0255772 A1* | 10/2010 | Hellman | 455/3.06 |

\* cited by examiner

SYSTEM, METHOD, AND COMPUTER PROGRAM FOR REMOTELY MANAGING A DIGITAL DEVICE

BACKGROUND

1. Field of the Invention

The present invention relates generally to media services, and more particularly to remotely managing a digital device.

2. Background Art

Conventionally, retail environments offer various products to customers. For example, digital devices can often be purchased in retail environments, such as electronic equipment stores. Because customers often want to view demonstrations of the products before purchase, the retail environments that offer the products typically maintain applications on the products that allow the products to demonstrate music, movies, and so forth.

Product demonstrations using applications are frequently outdated or otherwise not in keeping with media trends. For example, customers sometimes view demonstrations of songs or videos that are months old. Further, Internet-enabled products sometimes require the entry of account information to access services provided via the Internet.

SUMMARY OF THE INVENTION

A system, method, and computer program for remotely managing a digital device is provided. One or more digital devices are monitored. At least one matter associated with the one or more digital devices is identified. A resolution to address the at least one matter is generated. The resolution is then distributed from a remote location.

DESCRIPTION OF EXEMPLARY EMBODIMENTS

Figure 1:
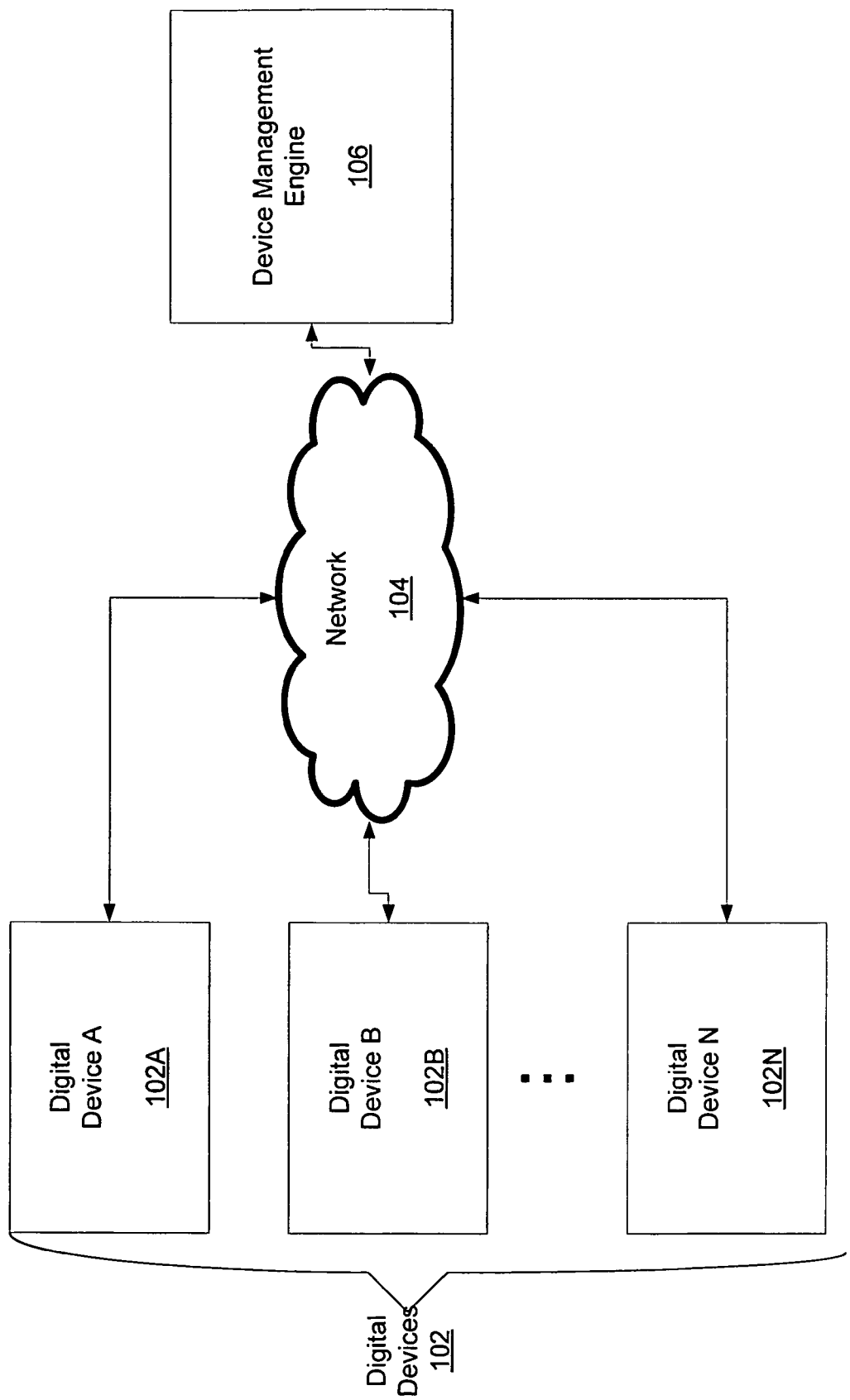
FIG. 1 is a block diagram of an exemplary environment for remotely managing digital devices.

Referring now to FIG. 1, a block diagram of an exemplary environment for remotely managing digital devices, such as digital music devices in a retail environment, is shown. A digital music system comprising a wireless, multi-room digital music system that lets you play digital music all over your house, business, or any other location may be provided. The digital music system may be controlled via a single digital music device. The digital music device may be sold in a retail environment. Similarly, a digital media system may be provided for allowing various media to be played throughout a hour, business, or any other location. The digital device may be monitored in order to provide updates, subscription service information, or any other automated data.

One or more digital devices 102, such as a digital device A 102A, a digital device B 102B, and a digital device N 102N, are in communication via a network 104 with a device management engine 106. The digital devices 102 may be associated with a retail environment, such as a retail brick and mortar store, an online retailer, and so forth. The device management engine 106 may be associated with a manufacturer, distributor, and/or service provider for the digital devices 102. Although digital devices 102 are discussed herein, any type of digital device may be managed remotely according to some embodiments.

The digital devices 102 can access the device management engine 106 via the network 104, directly, or via a computing device, such as a laptop or desktop computer, a cellular telephone, a personal digital assistant (PDA), a set top box, and so forth. According to exemplary embodiments, the device management engine 106 monitors the digital devices 102 via the network 104. In one embodiment, the digital devices 102 may connect to the device management engine 106 periodically via the network 104 to be monitored. Alternatively, the digital devices 102 may connect when an event occurs, such as when a user activate an application on the digital device 102 or attempts to log into a subscription service. The digital device 102 may initiate communication with the device management engine 106 according to some embodiments. The device management engine 106 may connect to one of the digital devices 102, which then monitors the other digital devices 102 through a local network, according to some embodiments. The digital devices 102 may be located within a retail environment or any other environment.

The digital devices 102 may be configured for demonstrations according to some embodiments. Accordingly, some of the digital devices 102 may be demonstration units and/or have modes of operation that include a demonstration mode.

Figure 2:
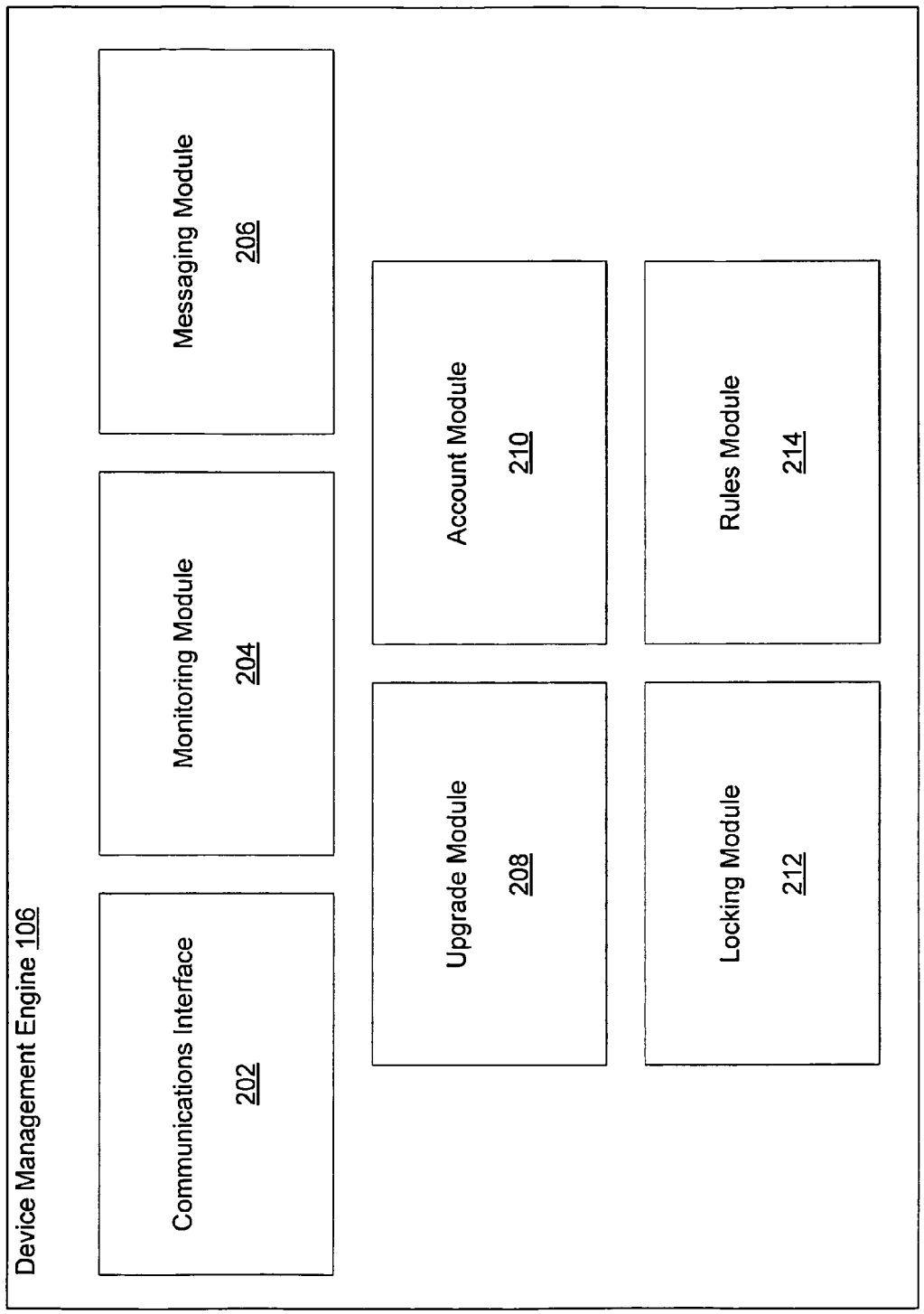
FIG. 2 is a block diagram of an exemplary device management engine.

FIG. 2 is a block diagram of an exemplary device management engine, such as the device management engine 106 shown in FIG. 1. The device management engine 106 may comprise at least a communications interface 202, a monitoring module 204, a messaging module 206, an upgrade module 208, an account module 210, and a locking module 212.

The communications interface 202 may facilitate communication between the device management engine 106 and the digital devices 102. For example, the communications interface 202 may communicate messages, such as emails, text messages, error messages, operational detail messages, software updates, and so forth to the digital devices 102.

A monitoring module 204 may monitor the one or more digital devices 102 within the retail environment. The retail environment may include one or more retail stores. For example, a retail store may sell various digital music devices, digital video devices, and so forth. Various digital devices 102 in hundreds of stores may be monitored. The monitoring module 204 may schedule times for the device management engine 106 to connect to these digital devices 102 via the network 104. The monitoring module 204 may then track user interaction with the digital devices 102, demonstrations being played by the digital devices 102, input from sales people associated with the digital devices 102, software application versions running on the digital devices 102, functioning of the digital devices 102, whether the digital devices 102 are on or off, and so forth. The digital devices 102 may push monitoring data to the device management engine 106 or the device management engine 106 may pull the monitoring data from the digital media devices 102. The monitoring may be event based, rather than schedule based. For example, the monitoring module 204 may monitor the digital media devices 102 when a dealer lock mode is enabled (discussed in further detail in associated with FIG. 4), when a retailer makes changes to the configuration associated with the digital media devices 102, and so forth.

Based on the monitoring, the monitoring module 204 may forward data obtained to one or more other modules associated with the device management engine 106.

Optionally, a telephone call or other communication may be initiated by a person or machine associated with the device management engine 106 to inform a person or machine associated with the retail environment about matters, issues, problems, etc. detected at one or more of the digital devices 102. According to one embodiment, the monitoring identifies the need for an upgrade, which triggers the communications interface 202 to send an email to someone, such as a sales person, to visit the retail environment that needs the upgrade or is experiencing other problems with the digital devices 102 being monitored.

According to some embodiments, digital devices 102 may identify themselves as retail units. The retail units may check in with the device management engine 106 to be monitored more frequently than other digital devices 102, for example. The retail units may be provided with different data from other digital devices 102 or otherwise be treated differently.

Monitoring the digital devices 102 may be utilized to identify various uses of the digital devices 102. For example, a profile for each of the digital devices 102 may be generated by the digital devices 102 or obtained from a third party, for example. The profile may then be utilized to determine what type of uses, content, or other information associated with the digital devices 102 may result in increased sales, decreased sales, or any other information associated with the retail environment. For example, retail store A may sell more of the digital devices 102, and the digital devices 102 sold at store A may have been used predominantly for Internet streaming. Any features, settings, demographics, or other information associated with the digital devices 102 may be utilized to generate the profiles. Any data from the profiles, or otherwise, may be utilized to determine sales trends.

A messaging module 206 may be provided for generating messages associated with the digital devices 102. The messages may include a resolution, such as an upgrade to software associated with the digital device 102. For example, a new version of an application on a digital video device may be provided. As another example, an updated version of an application for playing audio at a digital music device may be provided. The messaging module 206 may generate a message regarding the resolution, such as an upgrade, a message that the digital devices 102 is not functioning properly, such as being turned off or otherwise deactivated, a message with subscription or temporary access data, and so forth. Any type of message may be generated by the messaging module 206.

An upgrade module 208 may be provided in association with the device management engine 106. The upgrade module 208 may use data from the monitoring module 204 to determine whether or not a resolution comprising an upgrade of software, or other upgrades, are required or may be useful to the digital devices 102 being monitored. As discussed herein, the digital devices 102 may be monitored periodically or constantly via the network 104.

The upgrade module 208 may evaluate the data from the monitoring module 204 and determine what type of upgrade, or other resolution, to send to the digital device(s) 102. The resolution may be based on the data from the monitoring module 204 and data about the digital devices 102, itself, according to some embodiments. For example, a model number associated with the digital devices 102 may help determine the upgrade that should be sent to the digital devices 102. The upgrades or other resolution may be scheduled or randomized to avoid simultaneous upgrades to relieve strain on the device management engine 106, according to some embodiments.

The upgrade module 208 may send upgrades to the digital devices 102 based on new or updated demonstrations, new or updated audio or video tracks, bug or error fixes for existing applications, and so forth. Any type of data may be sent by the upgrade module 208. According to some embodiments, the upgrade module 208 instructs the digital devices 102 to activate itself, such as by turning itself on or registering with the device management engine 106. The upgrade module 208 may also make the upgrades available to the digital devices 102, such as by providing downloadable upgrades.

An account module 210 may be provided for registering the digital devices 102 with subscription services. The account module 210 may send subscription data, such as temporary login information, to the digital devices 102. Alternatively, the account module 210 can auto-populate a subscription registration for the digital devices 102 or otherwise automatically register the digital devices 102 for the subscription services. For example, the account module 210 may provide the digital devices 102 with a username and password for online service accounts, such as for a music download service. According to some embodiments, the account module 210 sends account information to the digital devices 102 periodically so the digital devices 102 can maintain current demonstration data. For example, the account module 210 can send subscription data to the digital devices 102 each month based on popular websites or services for the particular month.

According to some embodiments, the device management engine 106 may act as a proxy for the digital media devices 102 by communicating directly with a subscription service about a particular digital media device 102. For example, the device management engine 106 may communicate to the subscription service that digital media devices 102 with particular household identification numbers (or other identification information) are approved for trial accounts.

Optionally, each digital devices 102 and/or retail store may be provided with subscription data, such as a trial account, for example. For example, the account module 210 may provide the subscription data. The trial account may be customized for the digital devices 102 according to profile data associated with the digital devices 102, retail store location, or any other information. For example, digital devices 102 in retail stores in a Midwest region may have trial accounts for country music set up or pre-populated.

A locking module 212 may also be provided. The locking module 212 may send data to the digital devices 102 to lock the digital device 102 in a particular state. For example, the locking module 212 may remotely limit changes to settings associated with the digital device 102. In alternative embodiments, a locking mechanism may be provided on the digital devices 102, itself.

According to various embodiments, the locking mechanism may limit changes, return the digital devices 102 to a state so that a consistent presentation is displayed for another customer, prevent the deletion of files or applications, prevent certain content from being played or displayed, and so forth. For example, particular streaming content may be prevented from playing in the retail environment because it is not all-age appropriate. The locking mechanism may be implemented for any reason. The locking module 212 may remove or deactivate the locking mechanism for any reason, such as when the customer purchases the digital devices 102.

A rules module 214 may also be provided. The rules module 214 may determine a course of action when an event occurs, such as what type of resolution is appropriate, what default settings are appropriate based on registered users, registered retailers, and so forth. Specific resolutions may be provided based on rules associated with the rules module 214. For example, if the digital media device 102 is registered to a particular retailer, specific upgrades with preset features may be provided to the digital media devices 102 associated with the particular retailer. Any type of rules may be established by the rules module 214. According to exemplary embodiments, the rules module 214 may be updated with current rules data based on updates associated with retailers, the device management engine 106, the digital media devices 102, and so forth.

Although various modules are shown in FIG. 2 as part of the device management engine 106, fewer or more modules may comprise the device management engine 106 and still fall within the scope of various embodiments. For example, a retail profile database (not shown) may be provided for storing data about individual retail environments. Further, although FIGS. 1 and 2 detail the use of the digital devices 102 in retail environments, the digital devices 102 may be remotely managed within residential environments or other commercial environments. For example, the monitoring module 204 may monitor digital devices 102 in homes of users for providing remote resolutions, such as error fixes, upgrades, on/off indicators, account updates, and so forth.

In one embodiment, a retail store may register one or more of the digital devices 102 for management by completing an online registration process with the device management engine 106. The device management engine 106 provisions the digital devices 102 and the digital devices 102 are monitored and/or check in with the device management engine 106 periodically. Data from the digital devices 102 may be extracted and forwarded to subscription service providers that may then enable one or more trial accounts based on the data from the digital devices 102, such as a trial account from a music service provider.

In some embodiments, if the digital devices 102 fails to check-in with the device management engine 106 for a period of time (e.g., fourteen (14) days) the digital devices 102 may be deemed "inactive." Any trial accounts associated with the digital devices 102 deemed "inactive" may be disabled.

Figure 3:
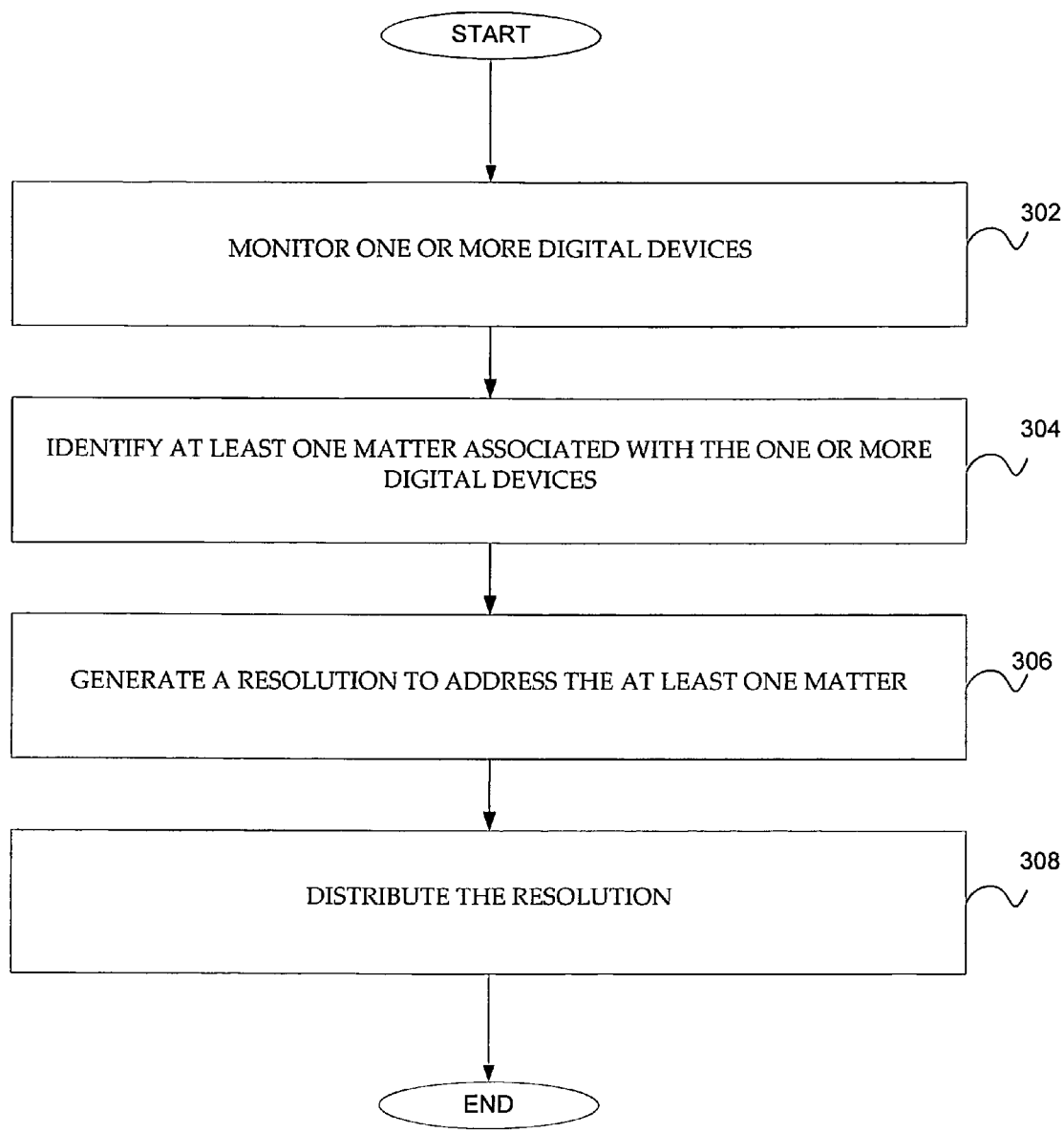
FIG. 3 is a flowchart showing an exemplary process for remotely managing digital devices in a retail environment.

FIG. 3 is a flowchart of an exemplary process for remotely managing digital devices, such as the digital devices 102 discussed herein. The digital devices 102 may comprise digital music devices or digital media devices according to exemplary embodiments. At step 302, one or more of the digital devices 102 are monitored. As discussed herein, the device management engine 106 may monitor the digital devices 102 within a retail environment, a residential environment, a commercial environment, or any other environment. The digital devices 102 may be monitored via the network 104 on a periodic basis or constantly. According to some embodiments, a retailer, a user, or any other person may request or set the frequency with which the digital devices 102 is monitored. According to other embodiments, the digital devices 102, itself, specifies the frequency for monitoring.

At step 304, at least one matter associated with the one or more digital devices 102 is identified. For example, the upgrade module 208 may identify the matter. The matter may comprise an available upgrade, a bug or error associated with an application on the digital devices 102, a lock needed to prevent particular content from being available on the digital devices 102, availability of an up-to-date demonstration, availability of subscription information for a subscription service, an operational problem, such as the device being turned off, and/or any other matter. The matter may be identified based on availability of new or up-to-date data for the digital devices 102, based on requests from the digital device or users associated with the digital devices 102, and/or based on data about the environment, such as the retail, residential, or commercial environment.

At step 306, a resolution to address the at least one matter is generated. For example, the messaging module 206 may identify the resolution. As discussed herein, based on the data about the environment and/or the digital devices 102, the digital management engine 106 may send upgrades, messages, setting limitations or changes, instructions, subscription account information, such as temporary logins and passwords, and so forth. Any type of resolution may be sent or otherwise communicated to or about the digital devices 102.

At step 308, the resolution is distributed. The resolution may be distributed directly to the digital devices 102 or to other devices associated with the environment, such as servers, computing devices, and so forth. According to some embodiments, one of the digital devices 102 receives the resolution and distributes the resolution to the other digital devices 102 in the same location or otherwise associated with the same environment. For example, in a user's home, one of the digital devices 102 may distribute upgrades to the other digital devices 102 in the same home. Accordingly, once one unit (i.e., digital devices 102) upgrades, the other units may also upgrade.

Similarly, the digital devices 102 associated with similar retail environments may also receive resolutions based on the resolution sent to one of the digital devices 102, so that a digital devices 102 at one of the retail locations perpetuates the resolutions to the digital devices 102 at more than one of, or all of, the retail environments associated with the one retail location. In alternative embodiments, each of the digital devices 102 may receive the resolution.

Figure 4A:
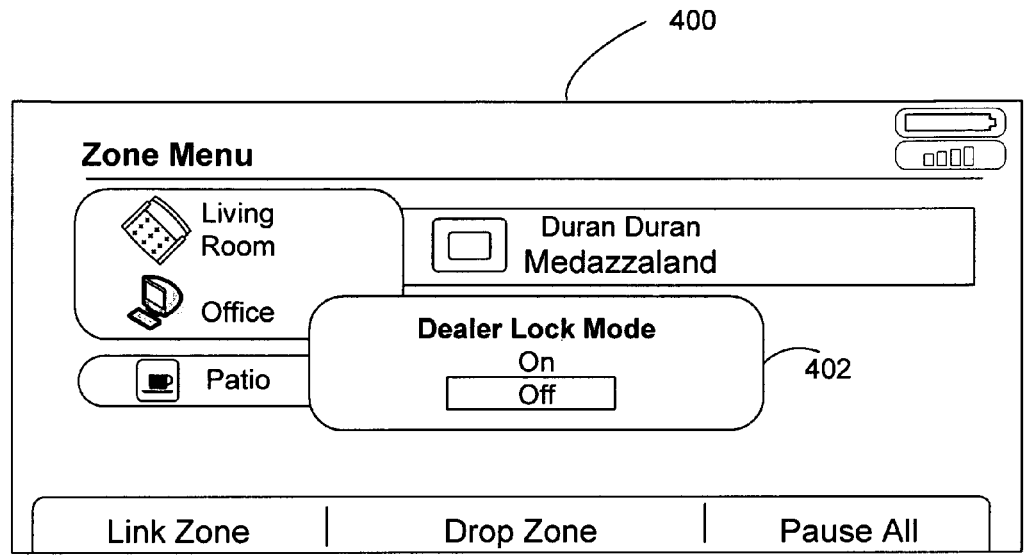
FIGS. 4A and 4B show screen shots of an exemplary lock mode associated with the digital devices.
Figure 4B:
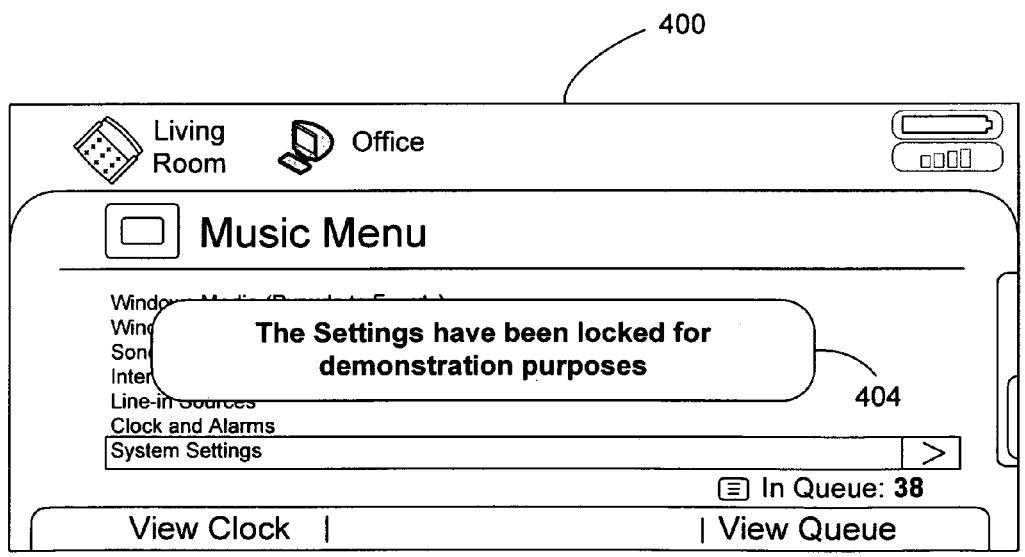

FIGS. 4A and 4B show screen shots of an exemplary lock mode associated with the digital devices 102. Menus 400 for a zone and for music are shown in FIGS. 4A and 4B, respectively. FIG. 4A shows a dealer lock mode 402. In the present example, the dealer lock Is set to "off."

FIG. 4B shows a dealer lock message 404 that communicates that "The Settings have been locked for demonstration purposes." The dealer lock mode 402 may be utilized to prevent the digital devices 102 from changes, such as system settings changes. For example, if settings associated with the digital devices 102 that are demonstration units are locked, customers, sales associates, or any other users may not be able to alter the settings for the particular digital devices 102. Accordingly, when the same digital device 102 is used for future demonstration, the original settings may be intact. Any type of settings, configuration, and so forth may be locked, such as music library management, zone player settings, controller settings, online update settings, and so forth.

The dealer lock mode 402 may be turned on or off. In some embodiments, a sequence of buttons is used to activate the menu for the dealer lock mode 402. Once the dealer lock mode 402 is activated, the settings may be inaccessible. When a user selects a settings option from the menus 400, a message, such as the dealer lock message 404, may be displayed. Optionally, a retail location may be provided with a pass code for deactivating the dealer lock mode 402. Any type of system may be implemented for activating or deactivating the dealer lock mode 402.

Figure 5:
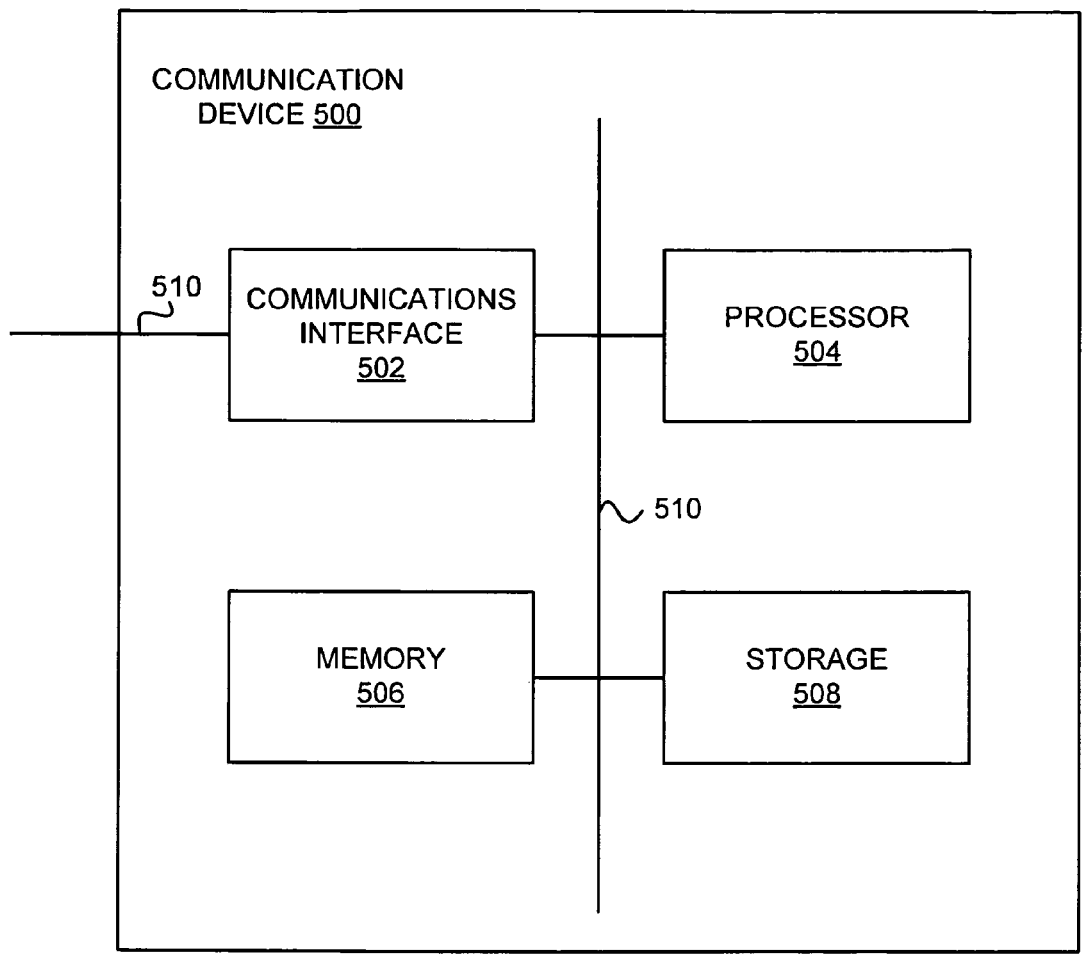
FIG. 5 shows an exemplary communication device.

FIG. 5 shows an exemplary communication device 500. The communication device 500 may comprise the device management engine 106 or the digital devices 102 according to some embodiments. The communication device 500 comprises at least a communications interface 502, a processor 504, a memory 506, and storage 508, which are all coupled to the bus 510. The bus 510 provides communications between the communications interface 502, the processor 504, the memory 506, and the storage 508.

The processor 504 executes instructions. The memory 506 permanently or temporarily stores data. Some examples of the memory 506 are RAM and ROM. The storage 508 also permanently or temporarily stores data. Some examples of the storage 508 are hard disks and disk drives.

The embodiments discussed herein are illustrative. As these embodiments are described with reference to illustrations, various modifications or adaptations of the methods and/or specific structures described may become apparent to those skilled in the art.

The above-described components and functions can be comprised of instructions that are stored on a computer-readable storage medium. The instructions can be retrieved and executed by a processor (e.g., processor 504). Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with the device management engine 106 may employ any of the desired functionality set forth hereinabove. Thus, the breadth and scope of a preferred embodiment should not be limited by any of the above-described exemplary embodiments.

What is claimed is:

1. A method for remotely managing one or more digital media devices comprising:
   determining based on an event, by a management device from a remote location over a network, that (i) one or more digital media devices are operating as retail units in a demonstration mode and (ii) a dealer lock is enabled;
   based on the determination, monitoring automatically, by the management device, the one or more digital media devices;
   identifying, by the management device, at least one issue resulting from demonstration of the one or more digital media devices;
   generating, by the management device, a resolution to remotely address the at least one issue at the one or more retail locations; and
   distributing the resolution by the management device from the remote location to the one or more digital media devices.

2. The method recited in claim 1, wherein the resolution comprises one or more upgrades for the one or more digital media devices.

3. The method recited in claim 1, wherein the resolution comprises automatic population of data for online service accounts.

4. The method recited in claim 1, wherein the resolution comprises a message indicating that the one or more digital media devices are not operating.

5. The method recited in claim 1, wherein the one or more digital media devices comprise one or more multimedia playback devices.

6. The method recited in claim 1, wherein the one or more digital media devices comprise one or more speakers.

7. The method recited in claim 1, further comprising remotely locking the one or more digital media devices to limit an ability for a user to change one or more settings of the one or more digital media devices.

8. The method recited in claim 1, further comprising remotely configuring the one or more digital media devices using a trial content subscription.

9. The method recited in claim 1, wherein distributing comprises distributing the resolution to one of the one or more digital media device which then distributes the resolution to other of the one or more digital media devices.

10. The method recited in claim 1, wherein one or more settings of the one or more digital media devices are locked when the device is in the demonstration mode and the dealer lock is enabled, the one or more digital media devices arranged to demonstrate playback of media via the one or more digital media devices to customers at one or more retail locations to promote a sale at the one or more retail locations.

11. A non-transitory computer readable medium having embodied thereon a program, the program being executable by a processor for performing a method for remotely managing one or more digital media devices, the method comprising:
    determining based on an event, by a management device from a remote location over a network, that (i) one or more digital media devices are operating as retail units in a demonstration mode and (ii) a dealer lock is enabled;
    based on the determination, monitoring automatically, by the management device, the one or more digital media devices;
    identifying, by the management device, at least one issue resulting from demonstration of the one or more digital media devices;
    generating, by the management device, a resolution to remotely address the at least one issue at the one or more retail locations;
    distributing the resolution by the management device from the remote location to the one or more digital media devices.

12. The non-transitory computer readable medium recited in claim 11, wherein the resolution comprises one or more upgrades for the one or more digital media devices.

13. The non-transitory computer readable medium recited in claim 11, wherein the resolution comprises automatic population of data for online service accounts.

14. The non-transitory computer readable medium recited in claim 11, wherein the resolution comprises a message indicating that the one or more digital media devices are not operating.

15. The non-transitory computer readable medium recited in claim 11, wherein the one or more digital media devices comprise a digital music system.

16. The computer readable medium recited in claim 11, wherein the one or more digital media devices comprise one or more digital media devices networked for customer demonstration at a point of sale.

17. The computer readable medium recited in claim 11, wherein one or more settings of the one or more digital media devices are locked when the device is in the demonstration mode and the dealer lock is enabled, the one or more digital media devices arranged to demonstrate playback of media via the one or more digital media devices to customers at one or more retail locations to promote a sale at the one or more retail locations 18. A system for remotely managing one or more digital media devices comprising:

a monitoring module configured to determine based on an event, from a remote location over a network, that (i) one or more digital media devices are operating as retail units in a demonstration mode and (ii) a dealer lock is enabled, the monitoring module configure to, based on the determination, automatically monitor the one or more digital media devices over a network from a remote location, the one or more digital media devices, and the monitoring module configured to identify at least one issue resulting from demonstration of the one or more digital media devices;

an upgrade module configured to generate a resolution to remotely address the at least one issue at the one or more retail locations; and a communications interface configured to distribute the resolution from the remote location to the one or more digital media devices.

19. The system recited in claim 18, wherein the resolution comprises one or more upgrades for the one or more digital media devices.

20. The system recited in claim 18, wherein the resolution comprises automatic population of data for online service accounts.

21. The system recited in claim 18, wherein the resolution comprises a message indicating that the one or more digital media devices are not operating.

22. The system recited in claim 18, wherein the one or more digital media devices comprise one or more multimedia playback devices.

23. The system recited in claim 22, wherein the one or more digital media devices comprise one or more speakers.

24. The system recited in claim 18, wherein one or more settings of the one or more digital media devices are locked when the device is in the demonstration mode and the dealer lock is enabled, the one or more digital media devices arranged to demonstrate playback of media via the one or more digital media devices to customers at one or more retail locations to promote a sale at the one or more retail locations.

\* \* \* \* \*